United States Patent [19]

Imaseki et al.

[11] Patent Number: 5,099,940

[45] Date of Patent: Mar. 31, 1992

[54] REAR WHEEL STEERING CONTROL SYSTEM FOR VEHICLE

[75] Inventors: Takashi Imaseki; Minoru Tamura; Toru Iwata; Yuichi Fukuyama, all of Kanagawa, Japan

[73] Assignee: Nissan Motor Company, Ltd., Japan

[21] Appl. No.: 575,011

[22] Filed: Aug. 30, 1990

[30] Foreign Application Priority Data

Sep. 1, 1989 [JP] Japan ................................ 1-227075

[51] Int. Cl.$^5$ ............................................. B62D 5/06
[52] U.S. Cl. ................................. 180/140; 180/142; 280/91; 364/424.05
[58] Field of Search ....................... 180/140, 142, 132; 280/91; 364/424.01, 424.05

[56] References Cited

U.S. PATENT DOCUMENTS 4,887,689 12/1989 Naito .
4,949,265 8/1990 Eguchi et al. .

FOREIGN PATENT DOCUMENTS 57-60974 4/1982 Japan .
62-71761 4/1987 Japan .

*Primary Examiner*—Charles A. Marmor
*Assistant Examiner*—Alan M. Kagen
*Attorney, Agent, or Firm*—Lowe, Price, LeBlanc & Becker

[57] ABSTRACT

A system for controlling a steering angle for the rear wheels of a vehicle is provided. This system includes generally a rotational speed sensor for detecting rotational speeds of front and rear wheels to provide a difference in rotational speeds between the front and the rear wheels, an angle sensor for sensing a steered angle of a steering wheel, a steering controller for determining a rear wheel target steering angle, and an actuator for steering the rear wheels by the rear wheel target steering angle. The steering controller calculates a component of a difference in rotational speeds between the front and rear wheels caused by a difference in turning tracks therebetween and compensates for this component by the difference derived by the rotational speed sensor to provide a correction value for the rotational speeds between the front and rear wheels caused by acceleration during turning as a correction for a rear wheel steering angle. The steering controller determines the rear wheel target steering angle based on the correction.

11 Claims, 3 Drawing Sheets

REAR WHEEL STEERING CONTROL SYSTEM FOR VEHICLE

BACKGROUND OF THE INVENTION

1. Technical Field

The present invention relates generally to a steering control system for a vehicle. More particularly, the invention relates to a rear wheel steering control system for determining rear wheel steering angle according to a degree of driven wheel slippage to improve steering stability when turning.

2. Background Art

It is well known in the art that four-wheel steering (4WS) vehicles are adapted for providing cornering forces on rear wheels during turns without slipping to improve turning stability.

A Japanese Patent First Publication No. 57-60974 discloses a rear wheel steering system. This system is operable to detect acceleration or centripetal force acting on a vehicle body during turns to steer rear wheels to the same phase as a steered angle of front wheels in the case of a front-wheel drive (FWD) vehicle or to a phase opposite the front wheels in the case of a rear-wheel drive (RWD) vehicle for preventing spin of the FWD vehicle from occurring which is caused by driven wheel slippage during turning with acceleration or, in the case of rear-wheel drive vehicles preventing drift-out from occurring.

The above prior art steering system is however provided with an acceleration sensor which is installed on a part of the vehicle body to detect acceleration including an unnecessary component induced by vehicle motion such as vertical displacement or pitching due to uneven road or acceleration, resulting in unsuitable rear wheel steering control.

For avoiding such drawbacks, a Japanese Patent First Publication No. 62-71761 discloses a rear wheel steering system which controls a steering operation for rear wheels based on a difference in rotational speeds between driven and compliance wheels to prevent the occurrence of spin or drift-out due to driven wheel slippage (i.e., due to rotational speed of the driven wheels being higher than that of the compliance wheels), during turning with acceleration.

The driven wheel slip is detected by determining the difference in rotational speeds between the driven and compliance wheels. As there is a difference in rotational speeds between front and rear wheels induced by a difference in turning radius therebetween in addition to the rotational speed difference due to the driven wheel slip, the rotational speed difference due to the turning radius difference impairs the rear wheel steering control greatly during turns with a minimum turning radius wherein the turning radius difference becomes great.

SUMMARY OF THE INVENTION

It is accordingly one object of the present invention to avoid the disadvantages of the prior art.

It is another object of the invention to provide a rear wheel steering control system which is adapted for compensating for a steering component induced by a difference in turning radius when driven wheel slip is detected to determine actual slip of the driven wheels correctly for providing rear wheel steering angle control according to the degree of slip.

According to one aspect of the present invention, there is provided a rear wheel steering control system for a vehicle which comprises a first means for monitoring a steered angle of front wheels to provide a signal indicative thereof, second means for determining a rear wheel steering angle in a preselected relation to the steered angle of the front wheels monitored by said first means, a third means for monitoring rotational speed of wheels to determine a first parameter, the third means determining a value representing a first difference in rotational speed between the front and rear wheels, fourth means for determining a turning radius of the vehicle during turning to determine a second parameter representing a second difference in rotational speed between the front and rear wheels caused by a difference in turning radii of the front and rear wheels and deriving a signal indicative thereof, fifth means for subtracting the second parameter from the first parameter to derive a third parameter representing a third difference in rotational speed between the front and rear wheels caused by wheel slippage relative to a road surface to provide a correction value for a rear wheel steering angle based on a variable value having a preselected relation to the third parameter, said fifth means compensating the rear wheel steering angle determined by said second means based on the correction value to determine a rear wheel target steering angle to derive a signal indicative thereof, and a sixth means responsive to the signal from the fifth means to control an actual steering angle of the rear wheel according to the rear wheel target steering angle.

According to another aspect of the invention, there is provided a rear wheel steering control system for a vehicle which comprises a first means for monitoring a steered angle of front wheels to provide a signal indicative thereof, a second means responsive to the signal from the first means to determine a rear wheel steering angle in a preselected relation to the steered angle of the front wheels to provide a signal indicative thereof, a third means for determining a turning radius to provide a value representing a difference in turning radii between the front and rear wheels based on the turning radius, the third means determining a value representing a difference in rotational speeds between the front and rear wheels, from which a component caused by the value representing the difference in turning radii is subtracted, to provide a signal indicative thereof, a fourth means for determining a correction for the rear wheel steering angle based on a parameter variable in a preselected relation to the rotational speed difference value determined by the third means, the fourth means adjusting the rear wheel steering angle based on the correction to provide a rear wheel target steering angle and providing a signal indicative thereof, and a fifth means responsive to the signal from the third means to control actual steering angle of the rear wheel according to the rear wheel target steering angle.

According to a further aspect of the invention, there is provided a rear wheel steering control system for a vehicle which comprises a first means for detecting rotational speed of wheels respectively to provide signals indicative thereof, a second means for determining a first difference in rotational speed between driven and compliance wheels based on the rotational speed detected by the first means to provide a signal indicative thereof, a third means determining a turning radius of the vehicle to provide a signal indicative thereof, a fourth means responsive to the signal from the third means to estimate a second difference in rotational speed between the driven and compliance wheels caused by a difference in turning radii thereof and providing a signal indicative thereof, a fifth means for determining a correction for the first difference by subtracting the first difference by the second difference, a sixth means for determining a rear wheel target steering angle based on the correction to provide a signal indicative thereof, and a seventh means responsive to the signal from the sixth means to steer the rear wheels by the rear wheel target steering angle.

DESCRIPTION OF THE PREFERRED EMBODIMENT

Figure 1:
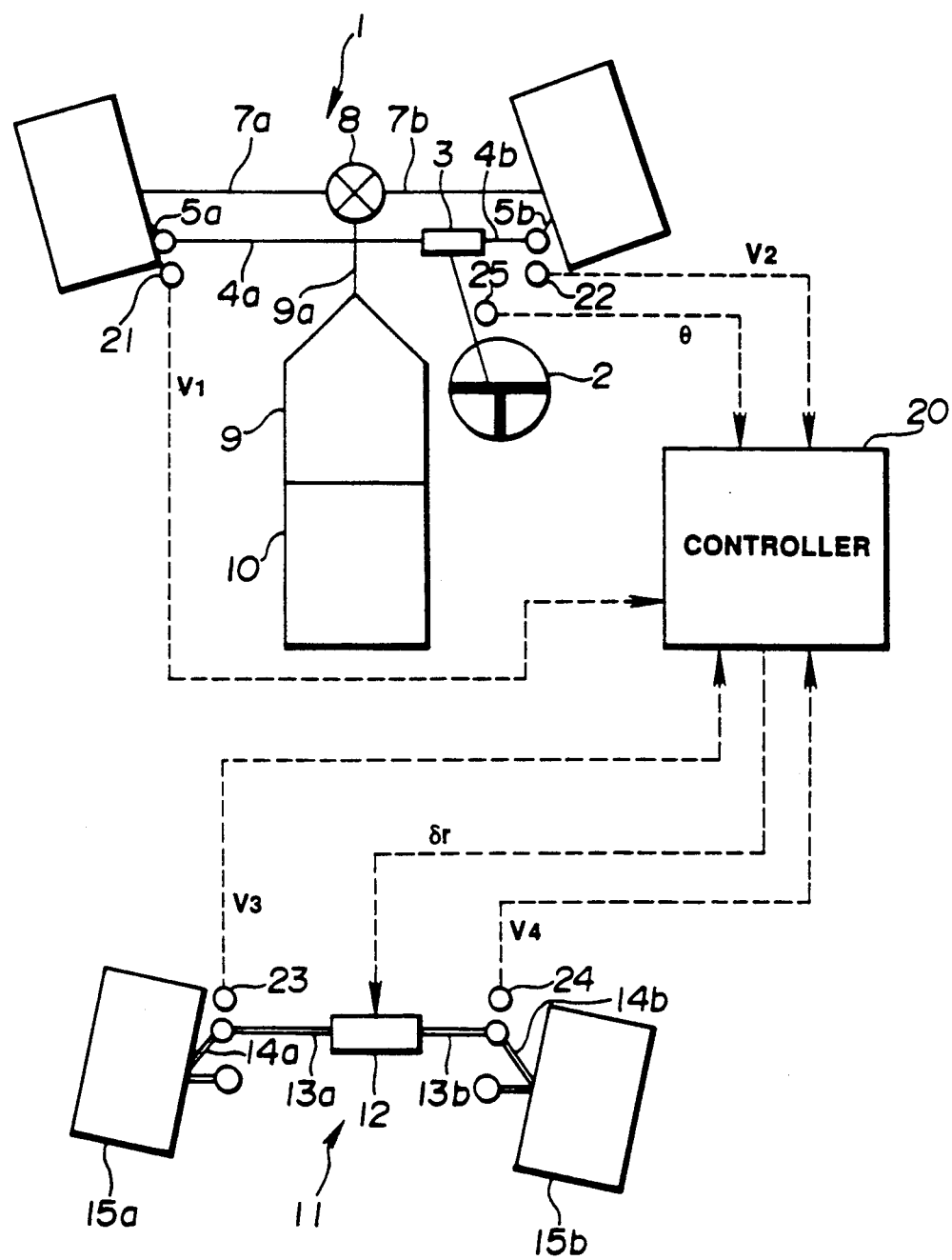
FIG. 1 is a block diagram of a steering system according to the present invention incorporated in a front-wheel drive vehicle.

Referring now to the drawings, particularly to FIG. 1, a steering control system according to the present invention is shown which is incorporated in a front-wheel drive (FWD) vehicle. This system includes generally a front wheel steering unit 1, a rear wheel steering unit 11, and a steering controller 20 operable to determine a rear wheel target steering angle.

The front wheel steering unit 1 includes a steering wheel 2, a rack-and-pinion steering gear 3, relay rods 4a and 4b, and knuckle arms 5a and 5b. The rack-and-pinion steering gear 3 changes rotational motion of the steering wheel 2 into stroke motion to laterally displace the relay rods 4a and 4b for steering front wheels 6a and 6b. Drive shafts 7a and 7b are connected to the front wheels 6a and 6b respectively to transmit drive torque thereto provided from an engine 10. Each drive shaft is connected to an output shaft 9a of a transmission 9 through a differential gear 8.

The rear wheel steering unit 11 includes a hydraulic cylinder 12 such as a spring centered double acting hydraulic pressure cylinder, tie rods 13a and 13b, and rear knuckle arms 14a and 14b coupling intermediate the tie rods and rear wheels 15a and 15b respectively. The hydraulic cylinder 12 hydraulically communicators with an electromagnetic proportional pressure control valve (not shown) which is connected to a pressure source (not shown). The control valve is responsive to a rear wheel steering angle signal $\delta r$ output from the steering controller 20 to provide hydraulic pressure to either of chambers in the hydraulic cylinder 12, displacing the tie rods 13a and 13b to steer rear wheels in a preselected direction.

The steering control system further includes a left front wheel rotational speed sensor 21 for determining speed $V_1$ of the left front wheel, a right front wheel rotational speed sensor 22 for determining speed $V_2$ of the right front wheel, a left rear wheel rotational speed sensor 23 for determining speed $V_3$ of the left rear wheel, a right rear wheel rotational speed sensor 24 for determining speed $V_4$ of the right rear wheel, and a steering angle sensor 25 for determining a steered angle $\theta$ of the steering wheel 2. These sensors provide signals indicative of detected parameters to the steering controller 20, which calculates a rear wheel steering angle based on those signals and then calculates a correction for the rear wheel steering angle to provide the signal $\delta r$ indicative of a corrected rear wheel steering angle.

Figure 2:
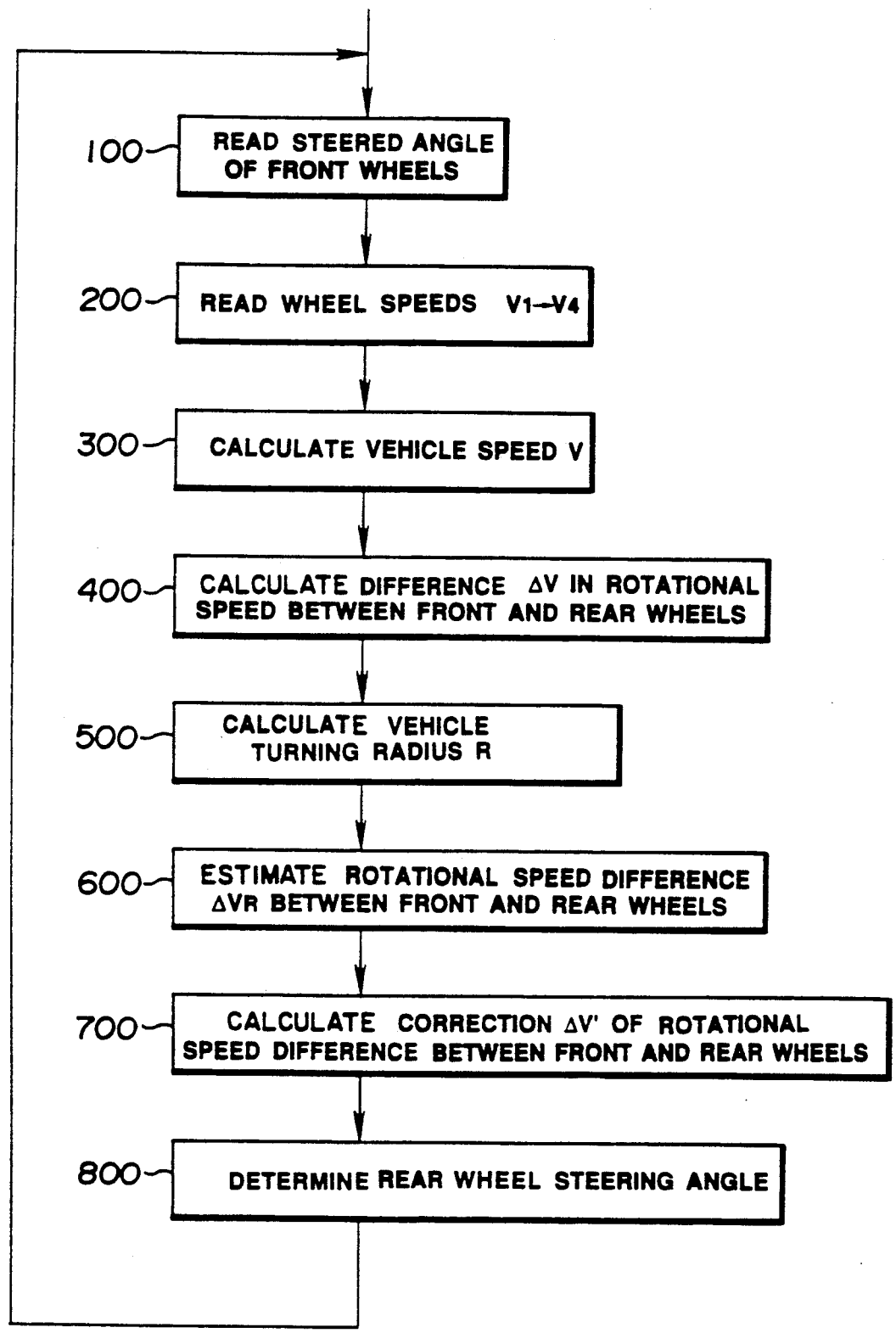
FIG. 2 is a flowchart of a sequence of logical steps carried out by a rear wheel steering control system of the invention.

Referring to FIG. 2, a flowchart of a program or sequence of logical steps performed by the steering controller 20 is shown. This program is made once every predetermined cycle. After entering the program, the routine proceeds to step 100 wherein a steered angle $\theta$ of the steering wheel is input from the steered angle sensor 25 to the steering controller 20. The routine proceeds to step 200 wherein the wheel speeds $V_1$ to $V_4$ are fed from the rotational speed sensors 21 to 24 to the steering controller 20. The routine then proceeds to step 300 wherein vehicle speed V is determined based on the wheel speeds derived in step 200 according to the following equation.

$$V = (V_1 + V_2 + V_3 + V_4)/4 \tag{1}$$

Subsequently, the routine proceeds to step 400 wherein a difference in rotational speeds $\Delta V$ between the front and rear wheels is determined according to the following relation.

$$\Delta V = (V_1 + V_2 - V_3 - V_4)/2 \tag{2}$$

The $\Delta V$ includes a first component representing the difference in rotational speeds between the front and rear wheels (this will be referred as $\Delta V_1$ hereinafter) which corresponds to driven wheel slippage caused by acceleration during turning and a second component representing the difference in rotational speeds between the front and rear wheels (this will be referred as $\Delta V_2$), caused by a difference in turning radii therebetween. As mentioned above, this $\Delta V_2$ affects the rear wheel steering control. Accordingly, the embodiment according to the present invention avoids this drawback in such a manner that the component of the $\Delta V_2$ is canceled so $\Delta V$ corresponds with $\Delta V_1$ for ensuring proper rear wheel steering control. First in step 500, a turning radius R of the vehicle is calculated according to the following equation.

$$R = (t_r \times V)/V_3 - V_4 \tag{3}$$

where $t_r$ is a tread of the vehicle. Subsequently, the routine proceeds to step 600 wherein based on the turning radius R, a difference $\Delta V_R$ in rotational speeds between the front and rear wheels is estimated which corresponds to $\Delta V_2$. This estimate is accomplished by referring to a table as shown in FIG. 3.

Figure 3:
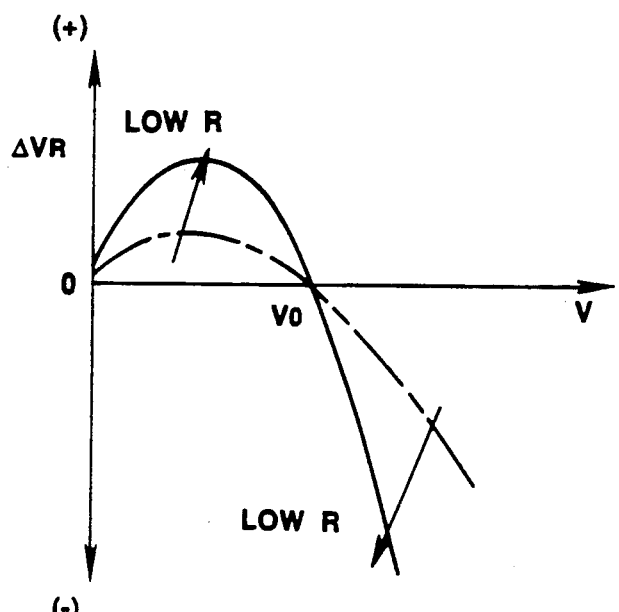
FIG. 3 is a table for a relation between turning radius R and vehicle speed V for estimating the difference, $\Delta V_R$, in rotational speeds between front and rear wheels.
Figure 4:
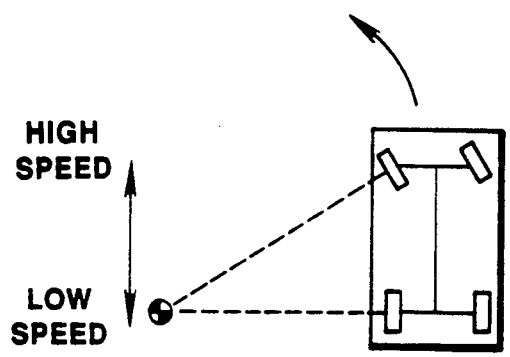
FIG. 4 is a stop schematic view for the variation in turning center of a vehicle due to vehicle speed.

Referring to FIG. 3, an example for estimating the front-rear wheel rotational speed difference $\Delta V_R$ according to a relation between the turning radius R and vehicle speed V is shown. In the drawing, the ordinate axis indicates the $\Delta V_R$ wherein front wheel rotational speed is greater than rear wheel rotational speed in a range above zero (+) while the rear wheel rotational speed is greater than the front wheel rotational speed in a range below zero (−). The abscissa axis indicates vehicle speed V which increases toward the right. Curves as indicated by solid and broken lines show characteristics with possible minimum turning radius and maximum turning radius respectively. The curves are in a plus range of the $\Delta V_R$ below the vehicle speed $V_o$ while these are in a minus range of the $\Delta V_R$ above the $V_o$. This is caused by longitudinal displacement of the turning center O of the vehicle dependent upon variation in the vehicle speed V as shown in FIG. 4 with the result that the front wheel rotational speed increases faster than the rear wheel rotational speed at low speed while it decreases slower at high speeds. The $\Delta V_R$ derived by the curves in FIG. 3 is represented by the following equation:

$$\Delta V_R = V \times X/R^2 \times (m \times V^2 \times a/C_{pr} \times X - X/2) \quad (4)$$

where m is vehicle weight, $C_{pr}$ is cornering power of the rear wheels, X is wheel base, and a is the distance between the center of gravity and point intermediate front wheels.

After determining $\Delta V_R$, the routine proceeds to step 700 wherein a corrected front-rear wheel rotational speed difference $\Delta V'$ is calculated. This calculation is implemented by subtracting the $\Delta V$ obtained by step 40 by the $\Delta V_R$ obtained by step 600 as shown by the following relation:

$$\Delta V' = \Delta V - \Delta V_R \quad (5)$$

The routine then proceeds to step 800 wherein a rear wheel target steering angle $\delta_r$ is mathematically calculated according to the following equation:

$$\delta_r = K \times \theta - T \times \dot{\theta} \quad (6)$$

where

K is $K' - \Delta K$

K' is a coefficient of a reference characteristic of rear wheel steering variable according to vehicle speed $\theta$ is steering wheel steered angle $\dot{\theta}$ is steering wheel angular velocity $\Delta K$ is a correction for a rear wheel steering angle T is a coefficient variable dependent upon the vehicle speed The above equation (6) is applied to a rear wheel steering control system in which a so-called phase inversion control is performed. In equation (6), the first term ($K\theta$) represents proportional members defining a rear wheel steering angle, dependent upon a steered angle ($\theta$) of the steering wheel, in the same phase as a steered angle of the front wheels; the second term ($T\dot{\theta}$) represents differential members providing a rear wheel steering angle having a phase opposite the front wheel dependent upon steering angular velocity ($\dot{\theta}$) of the steering wheel. Equation (6) provides rear wheel steering control such that the rear wheels are steered to the opposite phase upon initiation of steering where the steering angle ($\theta$) is relatively small and the steering angular velocity is relatively high and steered to the same phase when the steering is held where $\theta$ is relatively great and $\dot{\theta}$ is being reduced. It will be appreciated that the rear wheels are controlled to be steered to the opposite phase momentarily at steering initiation (this is also referred as a steering transition period) to improve response of yaw rate and then steered to the same phase as the steering and held to emphasize steering stability.

Figure 5:
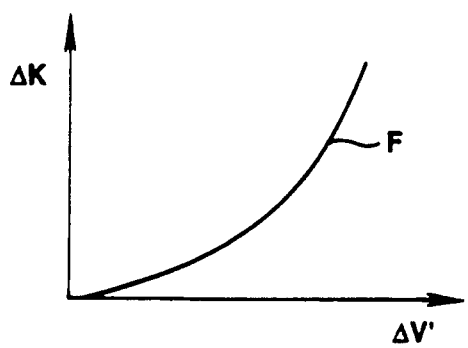
FIG. 5 is a table for a relation between a correction $\Delta K$ and a difference in rotational speeds between front and rear wheels.

The K of the proportional members ($K \times \theta$) of the above equation (6) is given by the relation of $K = K' - \Delta K$ and $\Delta K$ is defined according to a relation between a value of the $\Delta V'$ at that time and a preselected correction curve F as shown by a table in FIG. 5. In the correction table, $\Delta K$ becomes great as the $\Delta V'$ or the slip of the driven wheels becomes high. Assuming that the steered angle $\theta$ is A degrees where the steering wheel is substantially held ($\dot{\theta}$), the proportional members ($K \times \theta$) of the above equation (6) is $K \times A$ degrees and the differential member ($T \times \dot{\theta}$) is zero, obtaining the rear wheel steering angle $\delta_r = K \times A$ degrees.

If a throttle pedal is depressed suddenly during turning in such a condition, the driven wheels are subject to slip. However, the difference in rotational speed $\Delta V$ between the driven and compliance wheels at that time includes a difference in the rotational speed (i.e., the previously mentioned $\Delta V_2$) caused by a difference in the turning radii in addition to the slip component of the driven wheels due to the acceleration (i.e., the previously mentioned $\Delta V_1$). Thus, the rear wheel steering angle obtained without modifying the $\Delta V$ causes derivation of a rear wheel steering angle which includes a component corresponding to the rotational speed difference due to the turning raddii difference. Correction control for the rear wheel steering is sometimes performed even if no slippage of the driven wheels occurs ($\Delta V_1$).

Accordingly, this embodiment is operable to detect a vehicle turning radius R to estimate the turning speed difference $\Delta V_R$ corresponding to $\Delta V_2$ and cancels variations in steering properties due to $\Delta V_2$ based on $\Delta V_R$. With this control, the correction $\Delta K$ utilized in mathematical calculation of the rear wheel steering angle $\delta_r$ can correspond to a value of the driven wheel slip ($\Delta V_1$) completely, to adjust the proportional members ($K \times \theta$) correctly using the proper $\Delta K$ for providing an optimum rear wheel steering angle corresponding to turning conditions. For instance, in the case of a front-wheel drive vehicle as shown in FIG. 2, reducing a value of the proportional members ($K \times \theta$) with respect to the same phase steering causes cornering forces of the rear wheels to be decreased, ensuring swinging motion to prevent drift-out from occurring. While the above embodiment is directed to a front-wheel drive vehicle, the present invention may be applicable to a rear-wheel drive vehicle wherein increase in a value of the proportional members ($K \times \theta$) with respect to the same phase causes cornering forces of the rear wheels to be increased, restricting swinging motion of the vehicle to prevent a spin from occurring.

As previously mentioned, a feature of the present invention is that the rotational speed difference between the front and rear wheels ($\Delta V$) is subtracted by an amount equal to the rotational speed difference component ($\Delta V_R$) obtained by the turning track difference dependent upon the turning radius R to correct the proportional members ($K \times \theta$) of the rear wheel steering equation (6) utilizing the resultant value ($\Delta V'$) i.e. $DV_R$ is subtracted from $\Delta V$ to determine the correction $\Delta V'$. Thus, the rear wheel steering can be controlled based on the precise amount of driven wheel slip to effectively prevent spin due to acceleration during turning in the case of rear-wheel drive vehicles and preventing drift-out from occurring in the case of front-wheel drive vehicles.

The turning radius may also be determined based on a yaw rate or lateral acceleration derived from a lateral acceleration sensor for example.

What is claimed is:

1. A rear wheel steering system for a vehicle comprising:
    first means for monitoring a steered angle of front wheels to provide a signal indicative thereof;
    second means for determining a rear wheel steering angle in a preselected relation to the steered angle of the front wheels monitored by said first means;
    third means for monitoring rotational speed of wheels to determine a first parameter representing a first difference in rotational speed between the front and rear wheels to provide a signal indicative thereof;
    fourth means for determining a turning radius of the vehicle during turning to determine a second parameter representing a second difference in rotational speed between the front and rear wheels caused by a difference in turning radii of the front and rear wheels and providing a signal indicative thereof;
    fifth means for subtracting the second parameter from the first parameter to provide a third parameter representing a third difference in rotational speed between the front and rear wheels caused by wheel slippage relative to a road surface to provide a correction value for a rear wheel steering angle based on a variable value having a preselected relation to the third parameter, said fifth means compensating the rear wheel steering angle determined by said second means based on the correction value to determine a rear wheel target steering angle to provide a signal indicative thereof; and
    sixth means responsive to the signal from said fifth means to control an actual steering angle of the rear wheel according to the rear wheel target steering angle,
    said first means including a steering wheel sensor for detecting a steered angle $\theta$ of a steering wheel to monitor the steered angle of the front wheels and steering angular velocity $\dot{\theta}$ of the steering wheel, said third means monitoring the rotational speed of the wheels to further determine vehicle speed, said fifth means deriving the rear wheel target steering angle $\delta_r$ according to the following relation $$\delta_r = K \times \theta - T \times \dot{\theta}$$

where
    $K = K' - \Delta K$
    $K' =$ a coefficient of a reference characteristic of rear wheel steering, variable according to the vehicle speed
    $\Delta K =$ the correction value provided by said fifth means
    $T =$ a coefficient dependent upon vehicle speed.

2. A system as set forth in claim 1, wherein the correction value determined by said fifth means increases as the third difference in rotational speeds increases.

3. A system as set forth in claim 2, wherein the speed sensor determines rotational speeds $V_1$, $V_2$, $V_3$, and $V_4$ of front and rear wheels respectively, said fourth means calculating a turning radius R according to a relation of $R = (t_r \times V/V_3 - V_4)$ where $t_r$ is a tread of the vehicle and V is the vehicle speed, said fourth means calculating a component $\Delta V_R$ caused by the second difference in rotational speed between the front and rear wheels according to the following equation, $$\Delta V_R = V \times l/R^2 \times (m \times V^2 \times a/C_{pr} \times l - l/2)$$

where m is vehicle weight, $C_{pr}$ is cornering power of the rear wheels, l is a wheel base, and a is a distance between the center of gravity and a point intermediate the front wheels.

4. A system as set forth in claim 3, wherein said fifth means determines the third difference in the rotational speeds between the front and rear wheels $\Delta V'$ by subtracting a difference in rotational speeds between the front and rear wheels $\Delta V$ given by a relation of $\Delta V = (V_1 + V_2 - V_3 - V_4)/2$ by the component $\Delta V_R$, said fifth means calculating the correction $\Delta K$ based on a parameter which varies according to variation in a value of the $\Delta V'$ and providing the rear wheel target steering angle $\delta_r$ according to the following equation, $$\delta_r = K \times \theta - T \times \dot{\theta}$$

where
    $K = K' - \Delta K$
    $K' =$ a coefficient for a reference characteristic of rear wheel steering variable according to vehicle speed
    $\theta =$ a steered angle of a steering wheel
    $\dot{\theta} =$ steering angular velocity of a steering wheel
    $T =$ a coefficient depending upon the vehicle speed 5. A method of controlling a rear wheel steering unit of a vehicle having a front set of wheels, a rear set of wheels and a manually responsive steering controller for the front wheel set, one of said sets of wheels being driven by a power plant of the vehicle, the method comprising
    detecting rotational speeds of the front and back wheel sets,
    detecting the front wheel set steering angle,
    deriving a first parameter having a value corresponding to wheel slippage of the driven wheel set caused by acceleration during turning and a second parameter representing the difference in turning radii of the front and rear wheel sets in response to the detected rotational speeds of the front and back wheel sets, and
    controlling the rear wheel set steering angle by combining indications of the first and second parameters with the detected front wheel set steering angle so spin or drift out is substantially prevented in the presence of wheel slip of the driven wheel set,
    the rear wheel set steering angle being controlled in accordance with $(K\theta - T\dot{\theta})$, where K is a function of (a) the vehicle velocity, (b) the first parameter and (c) the second parameter, $T =$ is a function of the vehicle velocity, $\theta$ is the detected front wheel set steering angle and $\dot{\theta}$ is the time rate of change of the detected front wheel set steering angle.

6. Apparatus for controlling a rear wheel steering unit of a vehicle having a front set of wheels, a rear set of wheels and a manually responsive steering controller for the front wheel set, one of said sets of wheels being driven by a power plant of the vehicle, the apparatus comprising
    means for detecting rotational speeds of the front and back wheel sets,
    means for detecting the front wheel set steering angle,
    means for:
        (a) deriving a first parameter having a value corresponding to wheel slippage of the driven wheel set caused by acceleration during turning in response to the detected rotational speeds of the front and back wheel sets, (b) deriving a second parameter representing the difference in turning radii of the front and rear wheel sets, and (c) for combining indications of the first and second parameters with the detected front wheel set steering angle to derive a control signal for rear wheel steering angle having a value so spin or drift out is substantially prevented in the presence of wheel slip of the driven wheel set, and means responsive to the control signal for controlling the rear wheel set steering angle, the means for deriving the rear wheel set steering angle control signal deriving a signal in accordance with $(K\theta - T\dot{\theta})$, where K is a function of (a) the vehicle velocity, (b) the first parameter and (c) the second parameter, T = is a function of the vehicle velocity, $\theta$ is the detected front wheel set steering angle and $\dot{\theta}$ is the time rate of change of the detected front wheel set steering angle.

7. A method of controlling a rear wheel steering unit of a vehicle having a front set of wheels, a rear set of wheels and a manually responsive steering controller for the front wheel set, one of said sets of wheels being driven by a power plant of the vehicle and the other wheel set being a compliance set, the method comprising detecting rotational speeds of wheels on opposite sides of the compliance set, detecting the front wheel set steering angle, detecting the vehicle velocity, determining the vehicle turning radius in response to the detected vehicle velocity and an indication of the difference between the rotational speeds of the wheels on opposite sides of the compliance sets, and controlling the rear wheel set steering angle by combining indications of the detected front wheel set steering angle and a function of the determined vehicle turning radius.

8. A method of determining the turning radius of a vehicle having a rear wheel steering unit, a front set of wheels, a rear set of wheels and a manually responsive steering controller for the front wheel set, one of said sets of wheels being driven by a power plant of the vehicle and the other wheel set being a compliance set, the method comprising detecting rotational speeds of wheels on opposite sides of the compliance set, detecting the vehicle velocity, and determining the vehicle turning radius in response to the detected vehicle velocity and an indication of the difference between the rotational speeds of the wheels on opposite sides of the compliance set.

9. The method of claim 8 wherein the vehicle turning radius is determined in response to $(V_3 - V_4)/V$, where $V_3$ and $V_4$ are the detected rotational velocities of the opposite wheels and V is vehicle speed.

10. Apparatus for determining the turning radius of a vehicle having a rear wheel steering unit, a front set of wheels, a rear set of wheels and a manually responsive steering controller for the front wheel set, one of said sets of wheels being driven by a power plant of the vehicle and the other wheel set being a compliance set, the apparatus comprising means for detecting rotational speeds of wheels on opposite sides of the compliance set, means for detecting the vehicle velocity, means for determining the vehicle turning radius in response to the detected vehicle velocity and an indication of the difference between the rotational speeds of the wheels on opposite sides of the compliance sets.

11. The apparatus of claim 10 wherein the vehicle turning radius is determined in response to $(V_3 - V_4)/V$, where $V_3$ and $V_4$ are the detected rotational velocities of the opposite wheels and V is vehicle speed.

* * * * *